US005724068A

United States Patent [19]

Sanchez et al.

[11] Patent Number: 5,724,068

[45] Date of Patent: Mar. 3, 1998

[54] JOYSTICK WITH UNIFORM CENTER RETURN FORCE

[75] Inventors: Russell I. Sanchez, Seattle, Wash.; Hiroyoshi Fuchioka, Tochigi, Japan; Teruo Suzuki, Tochigi, Japan; Yuuichi Nakatsuka, Tochigi, Japan

[73] Assignee: Microsoft Corporation, Redmond, Wash.

[21] Appl. No.: 525,488

[22] Filed: Sep. 7, 1995

[51] Int. Cl.$^{6}$ .................................................... G06F 3/033

[52] U.S. Cl. ............................................................ 345/161

[58] Field of Search .................................... 345/161, 162, 345/166, 156, 159, 184, 190, 178; 178/18; 250/221, 229; 200/5 R, 6 A, 5 A, 11 J; 338/128, 170; 364/190

[56] References Cited

U.S. PATENT DOCUMENTS

| | | | |
|---|---|---|---|
| 3,666,700 | 5/1972 | Rothweiler et al. | 200/6 A |
| 4,488,017 | 12/1984 | Lee | 200/512 |
| 4,533,827 | 8/1985 | Fincher | 250/221 |
| 4,763,100 | 8/1988 | Wood | 338/128 |
| 4,801,914 | 1/1989 | Kerai | 338/170 |
| 4,856,785 | 8/1989 | Lantz et al. | 345/161 |
| 5,117,102 | 5/1992 | Mitchell | 250/221 |
| 5,229,742 | 7/1993 | Miyamoto et al. | 338/128 |
| 5,252,821 | 10/1993 | Sugimura et al. | 345/161 X |
| 5,286,024 | 2/1994 | Winblad | 345/161 |
| 5,398,028 | 3/1995 | Foon | 341/20 |
| 5,432,530 | 7/1995 | Arita et al. | 345/159 |
| 5,436,640 | 7/1995 | Reeves | 345/161 |
| 5,510,810 | 4/1996 | Nishijima et al. | 345/156 |
| 5,555,004 | 9/1996 | Ono et al. | 345/161 |
| 5,558,329 | 9/1996 | Liu | 345/161 |
| 5,559,432 | 9/1996 | Logue | 345/161 |
| 5,589,828 | 12/1996 | Armstrong | 345/161 |

*Primary Examiner*—Mark R. Powell
*Attorney, Agent, or Firm*—Seed and Berry LLP

[57] ABSTRACT

A computer joystick capable of detecting the position of a control stick in the X and Y directions, as well as the rotational (R) position of the control stick to allow three positional measurements to be made. The joystick uses an optical position detection circuit with a pair of light sources mounted either on the control stick or a printed circuit board mounted beneath the control stick. A photodetector assemble is mounted opposite the pair of light sources to detect light from the light sources. The distribution of the light intensity is indicative of the position of the control stick in the X, Y, and R directions. A single coil spring is used to return the control stick to a resting position when released by the user. The single spring provides an even return force that is dependent on displacement from the resting position. The bottom portion of the control stick moves in a three dimensional arcuate path as the control stick is manipulated by the user. To simplify operation of the optical position detection circuit, the joystick uses a mechanical three dimensional to two dimensional mechanical converter assembly to convert the arcuate movement of the control stick to two dimensional movement of the light sources.

27 Claims, 9 Drawing Sheets

JOYSTICK WITH UNIFORM CENTER RETURN FORCE

DESCRIPTION

1. Technical Field

The present invention is directed in general toward a positional control device, and more specifically, to a computer joystick.

2. Background of the Invention

A computer joystick is but one of many positional control devices commonly used to enter positional data into a computer. A conventional joystick encodes positional information in two orthogonal directions as the user manipulates the device. These two orthogonal directions of movement define a plane in which the joystick movement is measured. The planar position information is encoded using two potentiometers within the joystick, one potentiometer for each direction in the plane. As the user manipulates the joystick in the two directions, the resistance values of the potentiometers change. It is this change in resistance that is used to detect the planar position.

There are significant drawbacks to the conventional joystick technology. The positional accuracy is determined by the accuracy of the resistance measurement process. However, the accuracy of the potentiometers is typically ±10%, and the thermal drift of the potentiometers causes the resistance to change over time. Furthermore, the angular tolerance of the potentiometers in the conventional joystick is typically ±5° or more. The conventional joystick often has considerable play, particularly near the center or home position where the handle may move through as much as 30% of the total range of movement without causing a change in the resistance of the potentiometers.

In addition to the positional data errors, the conventional joystick has certain undesirable mechanical features. The techniques used to return the conventional joystick to its center or "resting" position create an undesirable uneven pull on the joystick.

Therefore, it can be appreciated that there is a significant need for a computer joystick that overcomes the limitations of the conventional joystick and provides a smooth feel for the user with a uniform return force and which overcomes the inaccuracies of the conventional position measurement circuit. The present invention provides these and other advantages as will be apparent from the following detailed description and drawings.

SUMMARY OF THE INVENTION

The present invention is embodied in a joystick comprising a housing, a control stick with an upper end for grasping and moving by the user and a control stick lower end within the housing whose movement is responsive to user movement of the control stick upper end. The control stick has a resting position when not grasped by the user. A position detector circuit within the housing is capable of detecting the position of the control stick. In one embodiment, a spring retainer is fixably mounted within the housing. A coil spring has an upper spring end coupled to the control stick lower end and a lower spring end engaging the spring retainer to compress the coil spring between the control stick lower end and the spring retainer. The coil spring supplies a centering force to the control stick to cause the control stick to return to the resting position.

The joystick may also include a thrust member mounted between the upper spring end and the control stick lower end and a plurality of circumferentially distributed thrust member stop elements within the housing to limit the upward movement of the thrust member as the control stick is moved by the user. This maintains the upper spring end in continuous mechanical contact with the thrust member. The thrust member is a substantially flat plate and the engagement surface in contact with the thrust plate is also substantially flat. The control stick upper end has a predetermined range of movement and the coil spring has a length of contact surface engaging the flat thrust member. The thrust member stop elements interact with the flat thrust member to limit upward movement thereof. In such manner, the spring contact surface is in continuous engagement with the flat thrust member along the entirety of the length of spring contact surface during movement of the control stick upper end throughout its entire range of movement.

The control stick has upper and lower curved members at the lower end of the control stick. The upper curved member extends through an aperture in the housing and is retained against upward movement by the housing aperture. The upper curved member has a substantially hemispherical surface with a first diameter sized to be received by the housing aperture. The lower curved member also has a substantially hemispherical surface with a second diameter smaller than the first diameter to be rotatably received and retained against downward movement by a control stick retainer. The upper and lower curved members may have a common center point.

The joystick has a rotational axis of movement wherein the position detector circuit detects a rotational position of the control stick. The control stick has a rotational resting position and the joystick further includes a rotational spring mounted within the housing to urge the control stick to its rotational resting position. In one embodiment, the position detection circuit uses optical light sources and detectors to determine the position of the control stick.

As the control stick upper end is manipulated by the user, the control stick lower end moves in a corresponding arcuate fashion. The arcuate movement of the control stick lower end is translated into a two-dimensional movement by a coupling having a flexible portion in mechanical contact with the control stick's lower end and a rigid portion wherein the coupling is slideably positioned between the control stick lower end and a sliding surface to constrain movement of the coupling to planar movement.

DETAILED DESCRIPTION OF THE INVENTION

Figure 1:
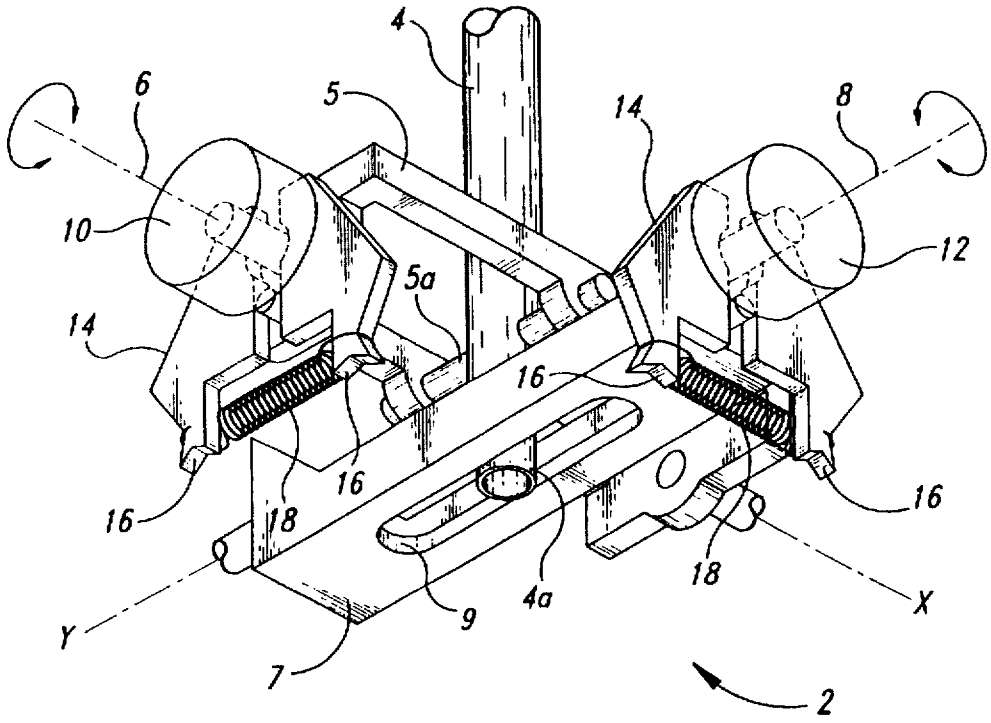
Fig. 1 (Prior Art)
FIG. 1 illustrates the positional encoding techniques of a conventional joystick.

A conventional computer joystick 2 is illustrated in FIG. 1, for connection to an industry standard game port (not shown) in a computer (not shown). A control stick 4 of the conventional joystick 2 is pivotally mounted at a lower end. The upper end of the control stick 4 is operable by the user to angularly move or tilt the control stick. The lower end of the control stick 4 is pivotally mounted to a pair of orthogonally oriented upper and lower hinged members 5 and 7. The upper hinge member 5 is a rectangular frame that pivots about an axis of rotation 6 to encode movement of the control stick 4 in a direction designated herein as the X direction. The control stick 4 is coupled to the upper hinge member 5 by a pivot pin 5*a* which allows free movement of the control stick in the Y direction without rotating the upper hinge member but transmits movement of the control stick in the X direction into rotation of the upper hinge member about the axis 6. The lower hinge member 7 is a plate oriented orthogonal to the upper hinge member 5 and pivots about an axis of rotation 8 to encode movement of the control stick 4 in a direction designated herein as the Y direction. A slot 9 is provided in the lower hinge member 7 and a tab 4*a* of the control stick 4 extends into the slot to permit movement of the control stick in the X direction without rotating the lower hinge member, but to rotate the lower hinge member about the axis 8 when the control stick is moved in the Y direction. Thus, the hinge members 5 and 7 pivot in response to user movements of the control stick 4 in the X and Y directions. The conventional joystick 2 is capable of rotational movement only in the two axes designated herein as the X and Y axes.

The position of the control stick 4 in the X and Y directions is determined by a pair of potentiometers 10 and 12 mounted to the hinge plates 5 and 7, respectively. As the hinge member 5 pivots about the axis 6, it causes rotation of the X potentiometer 10, thus changing the resistance value of the X potentiometer. Similarly, as the control stick 4 is moved in the Y direction, the hinge member 7 pivots about the axis 8 and causes rotation of the Y potentiometer 12 thus changing its resistance value. In this manner, the position of the control stick 4 may be independently determined in both the X and Y directions. The precise measurement of the resistances of the X and Y potentiometers 10 and 12 is well known in the art and will not be discussed herein. It should be noted that, while the position of the control stick 4 is measured in a plane defined by the X and Y directions, the actual movement of the control stick is an angular or tilting movement.

A first pair of arms 14 are mounted adjacent to the X potentiometer 10 and are hinged together at one end and each terminate in a free end 16. A return spring 18 extends between the free end 16 of the arms 14, thus urging the free ends toward each other. When the control stick 4 is moved in the X direction, the arms 14 and return spring 18 tend to force the control stick 4 back to a center position at which the force exerted by the return spring 18 is minimal.

Similarly, a second pair of arms 14 are mounted adjacent to the Y potentiometer 12 and are hinged together at one end and each terminate in a free end 16. A return spring 18 extends between the free end 16 of the arms 14 and urges the free ends toward each other to tend to force the control stick 4 back to the center position when moved in the Y direction. Thus, the return springs 18 across the X and Y potentiometers 10 and 12 force the control stick toward the center position in both the X and Y directions when released by the user. The center position is also referred to herein as a "resting" position.

A significant drawback of using the two return springs 18 is that the centering force exerted by the return springs is uneven. As the control stick 4 is tilted and thus displaced from the resting position, each of the return springs 18 independently exerts a force that increases in a substantially linear fashion as the displacement of the control stick increases. The return force has a maximum value when the control stick 4 is displaced to its maximum position in both the X and Y directions. However, the return force exerted by each of the return springs 18 has a notch associated with the center position of each of the X and Y directions. That is, as the control stick 4 passes through either the X or Y axis, the return spring 18 on the Y and X potentiometers 10 and 12, respectively, pass through a minimum, thus creating the notch. This effect can be readily demonstrated by simultaneously displacing the control stick 4 in both the positive X and Y directions. While holding the control stick at its position in the Y direction, and simultaneously moving the control stick to a position in the negative X direction, the control stick 4 has a minimum force exerted in the X direction as the control stick passes through the X axis and the return spring 18 associated with the X potentiometer 10 is at its minimum displacement. Similarly, there is a characteristic notch in the return force in the Y direction any time the control stick 4 crosses the Y axis. This effect is caused by slack in each of the return springs 18 at their respective axes. For example, whenever the control stick 4 crosses the X axis, the return spring 18 for the Y potentiometer 12 has some mechanical slack or free play where movement in the Y direction does not cause a change in the force exerted by the return spring for the Y potentiometer. Similarly, the return spring 18 for the X potentiometer 10 exhibits the same mechanical slack whenever the control stick 4 crosses the Y axis. This characteristic notch creates an unpleasant sensation in the user because the return force is not applied evenly throughout the range of movement of the control stick 4.

Figure 2A:
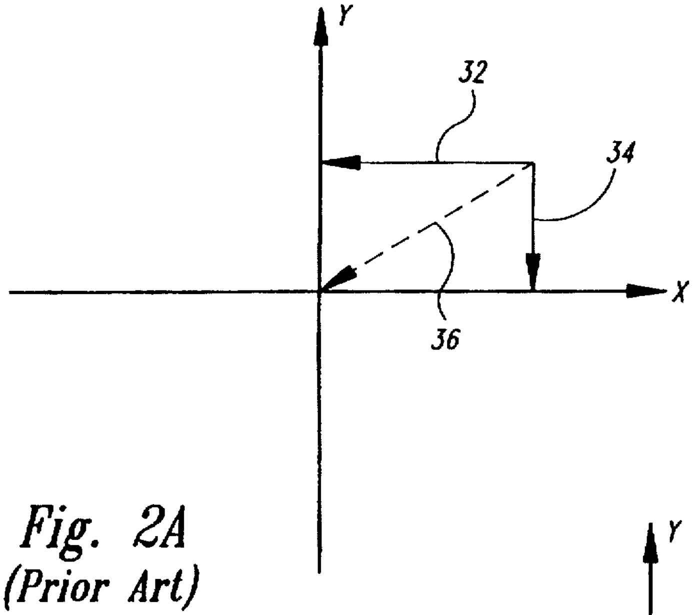
Fig. 2A (Prior Art)
FIG. 2A illustrates the vector return force exerted when the joystick of FIG. 1 is displaced.

The return force may be viewed characteristically as a pair of independent vector forces exerted by the return springs 18. The return spring 18 associated with the X potentiometer 10 generates an X return vector 32, illustrated in FIG. 2A, which urges the control stick 4 to a point of minimum displacement of the return spring corresponding to the resting position of the control stick along the X axis 8. Similarly, the return spring 18 associated with the Y potentiometer 12 also exerts a force, designated in FIG. 2A as the Y return vector 34, urging the control stick 4 to a point of minimum displacement of the return spring, corresponding to the resting position of the control stick along the Y axis 6.

Figure 2B:
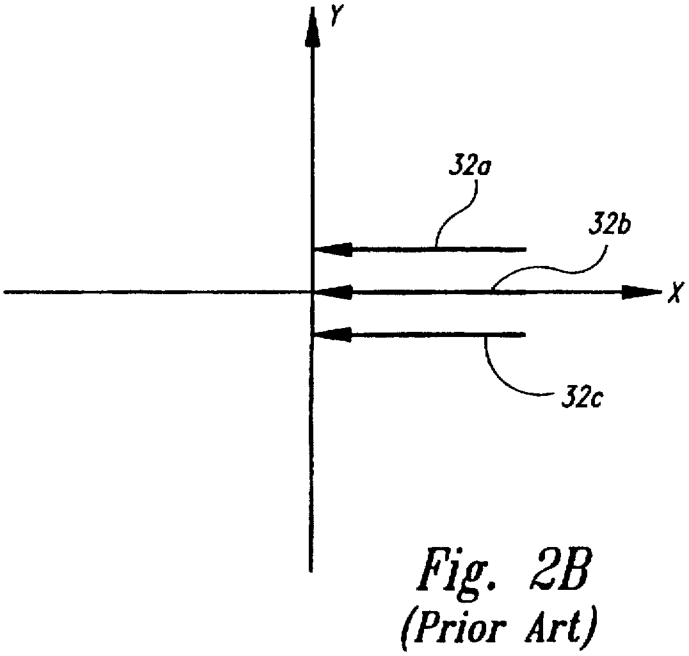
Fig. 2B (Prior Art)
FIG. 2B illustrates an error in the vector return force exerted when the joystick of FIG. 1 is displaced.

The total return force exerted on the control stick 4 is a vector sum 36 of the X vector 32 and the Y vector 34 resulting in a force directing the control stick 4 to the resting position for both the X and Y directions. However, the mechanical slack described above, together with independent X vector and Y vector 34, cause the undesirable notch in the return force. As illustrated in the example of FIG. 2B, the control stick 4 is at a minimum displacement in the Y direction, such that the return spring 18 on the Y potentiometer 12 direction, is at its slack position, as described above. This mechanical slack results in a situation in which no Y vector 34 is present even though the control stick 4 may be displaced from the Y axis. This is illustrated by a series of three X vectors **32*a*–32*c*, each of which exerts an identical return force in the X direction. However, due to the mechanical slack, there is no Y vector 34 (see FIG. 2A) associated with any of the X return vectors 32*a*–32*c*. Thus, the user feels a return force 32*b* when the control stick has no displacement in the Y direction. However, the user feels an identical return force 32*a* and 32*c*** when the control stick is displaced slightly in the +Y and −Y directions, respectively.

The present invention provides a computer joystick that digitally encodes position information using an optical position measurement system capable of providing four independent position measurements. These four independent position measurements include a rotational or twisting axis of movement as well as the X and Y axes of movement found in the conventional joystick 2. In addition, the present invention provides a uniform force to return the control stick to its resting position.

Figure 3:
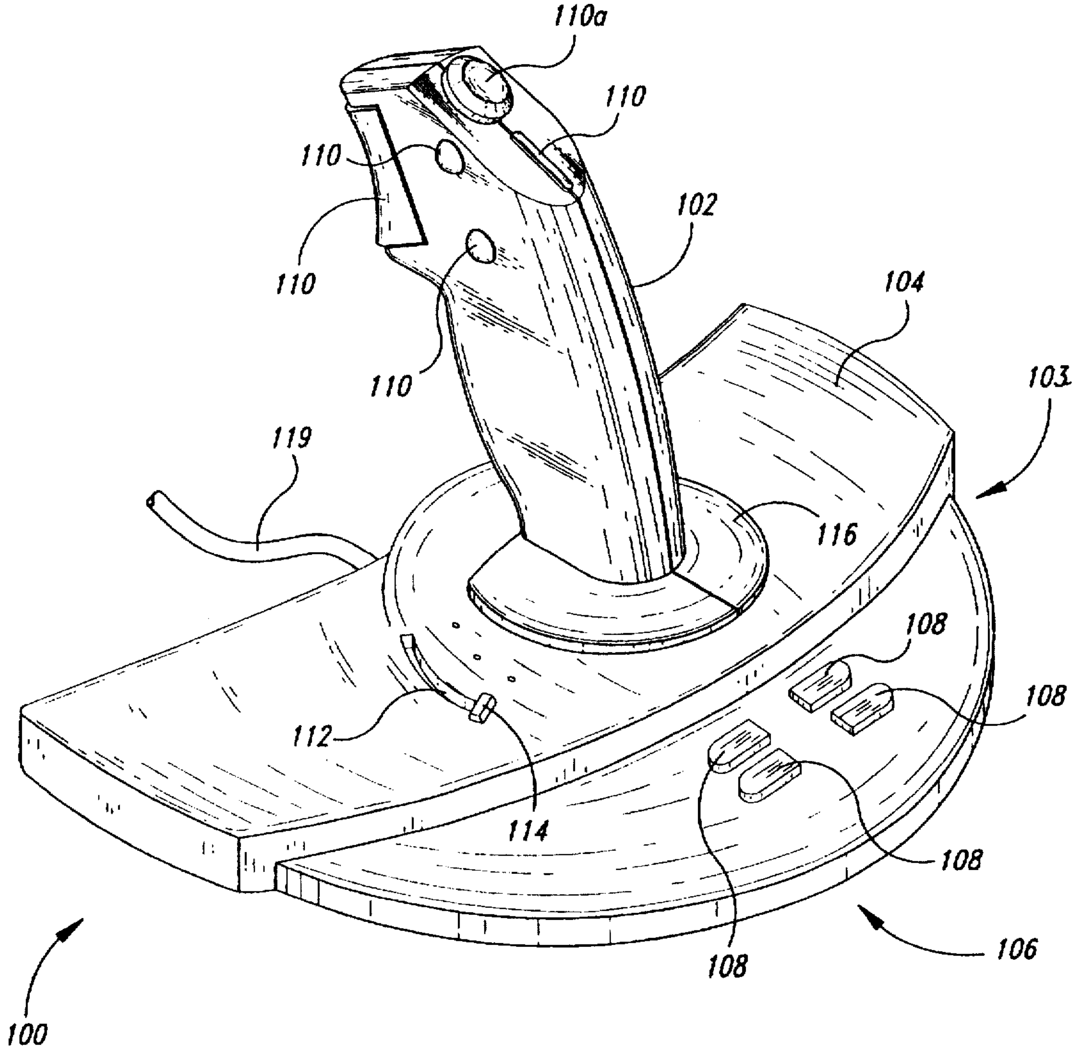
FIG. 3 illustrates the joystick of the present invention.

The present invention is embodied in a digital joystick 100 illustrated in FIG. 3. The digital joystick 100 includes a control stick 102 coupled to a housing 103 having an upper housing portion 104 and a lower housing portion 106. The lower end of the control stick 102 includes a flange 116. The digital joystick 100 has four buttons 108 mounted on the upper housing portion 104, and an additional four buttons 110 mounted on the control stick 102. In addition, the control stick includes a four position, top hat button **110*a*, which may be moved in one direction (up, down, left, or right) or in two directions simultaneously (up-right, down-fight, down-left, and up-left). Thus, the top hat button 110*a*** can be used to encode up to eight different directions with a 45° displacement.

The control stick 102 is movable in the X and Y directions, as is the conventional joystick 2 (see FIG. 1). However, the control stick 102 is also capable of rotational displacement relative to the housing 103, providing a third axis of movement for the control stick 102. The technique used to encode the X position, Y position, and rotational (R) position of the control stick 102 will be discussed in detail below.

The upper housing portion 104 includes a slot 112 through which a slideable member 114 protrudes. The slideable member 114 provides the digital joystick 100 with a fourth independent axis of movement. The technique used to encode the position of the slideable member 114 will be discussed in detail below.

The digital joystick 100 is coupled to the conventional game port (not shown) of the computer (not shown) by a cable 119. Alternatively, the digital joystick 100 may be coupled to a conventional serial or parallel I/O port (not shown) in the computer. In additional, the digital joystick may be remotely coupled to the computer by a number of well-known techniques, such as are typically used with remote control television sets. In such an embodiment the cable 119 is replaced by the remote control link. A remote link between the digital joystick 100 and the computer (not shown) is well known in the art, and will not be discussed herein.

Figure 4:
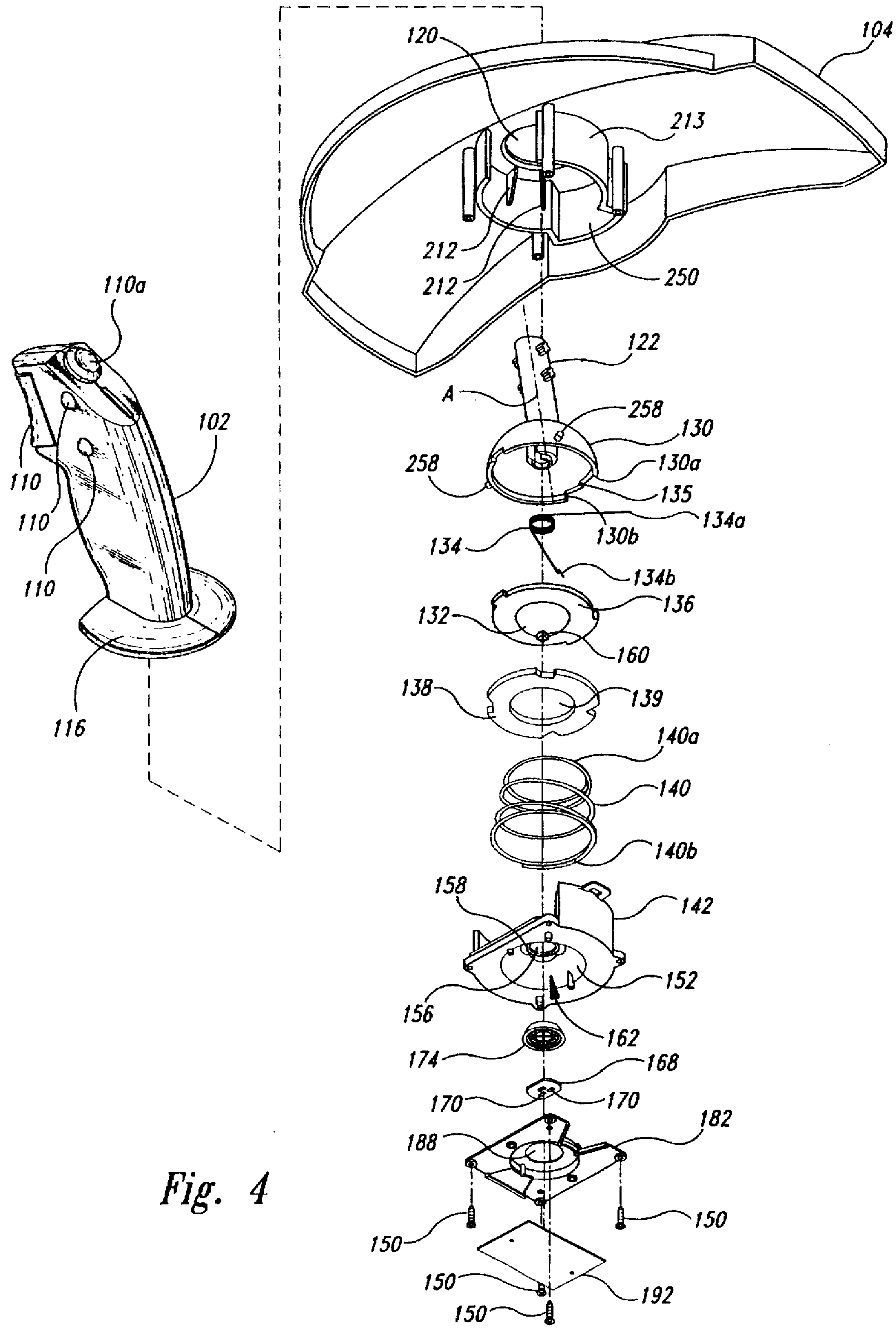
FIG. 4 is a reduced scale, exploded perspective view of the joystick of FIG. 3.

The digital joystick 100 is also illustrated in the exploded view of FIG. 4. The upper housing portion 104 contains an circular aperture 120 through which an elongated shaft 122 protrudes. The control stick 102 is rigidly attached to the shaft 122 such that the shaft may be considered part of the control stick. The shaft 122 has a longitudinal axis indicated by the broken line A. The lower portion of the shaft 122 terminates in an upper curved member 130 having an upwardly facing, substantially hemispherical shaped surface and a downwardly facing lower curved member 132 also having a substantially hemispherical shaped surface but with a smaller diameter than that of the surface of the upper curved member. The upper curved member 130 is formed integral with the shaft 122. The upper and lower curved members 130 and 132 have a common center point, which coincides with the longitudinal axis A of the shaft 122. The circular aperture 120 is sized to rotatably receive the upper curved member 130 and prevent its upward passage through the aperture.

A rotational return spring 134 is secured to the shaft 122 to force the shaft, and the control stick 102 attached thereto, to a rotational resting position. The operation of the rotational return spring 134 will be discussed in detail below. The lower curved member 132 has an engagement surface in the form of a flat lip 136 extending circumferentially thereabout. A thrust plate 138 is positioned below and has an upper side in mechanical contact with the lip 136. The thrust plate 138 has a central aperture 139 sized large enough to permit the lower curved member 132 to project downward therethrough without contacting the thrust plate.

The digital joystick 100 includes a single centering spring 140, which is a tapered coil spring. The centering spring 140 has an upper end **140*a* that is in mechanical contact with the lower side of the thrust plate 138. The centering spring 140 also has a lower end 140*b* which is received by a spring retainer 142. The spring retainer 142 is rigidly attached to the upper housing portion 104 by screws 150. With the spring retainer 142 fastened to the upper housing portion 104, the centering spring 140 is compressed between the thrust plate 138, at its upper end 140*a* and the spring retainer 142 at its lower end 140*b*. The spring retainer 142 has a central conical protrusion 152 which extends upward through the center of the centering spring 140. A top portion 153 (see FIGS. 5A and 5B) of the conical protrusion 152 has a seat 158 sized to seatingly receive the lower curved member 132. The seat 158 has a central aperture 156 to permit the lower curved member 132 to project downward therethrough. The lower curved member 132 has a tab 160 at its bottom end which is positioned within an interior portion 162 of the conical protrusion 152. Also contained within the interior portion 162 is an upper printed circuit (PC) board 168. First and second light emitting diodes (LEDs) 170 are mounted on the upper PC board 168. The LEDs 170 are used to detect the position of the control stick 102, as will be described in greater detail below. Other conventional light sources can be used if desired. The upper PC board 168 is mechanically retained within a PC retainer 174 for travel therewith. In the illustrated embodiment, the upper PC board 168 is press-fit into the PC retainer 174**, but may be mechanically fastened to the PC retainer by an adhesive or other conventional mechanical fastener.

Figure 8A:
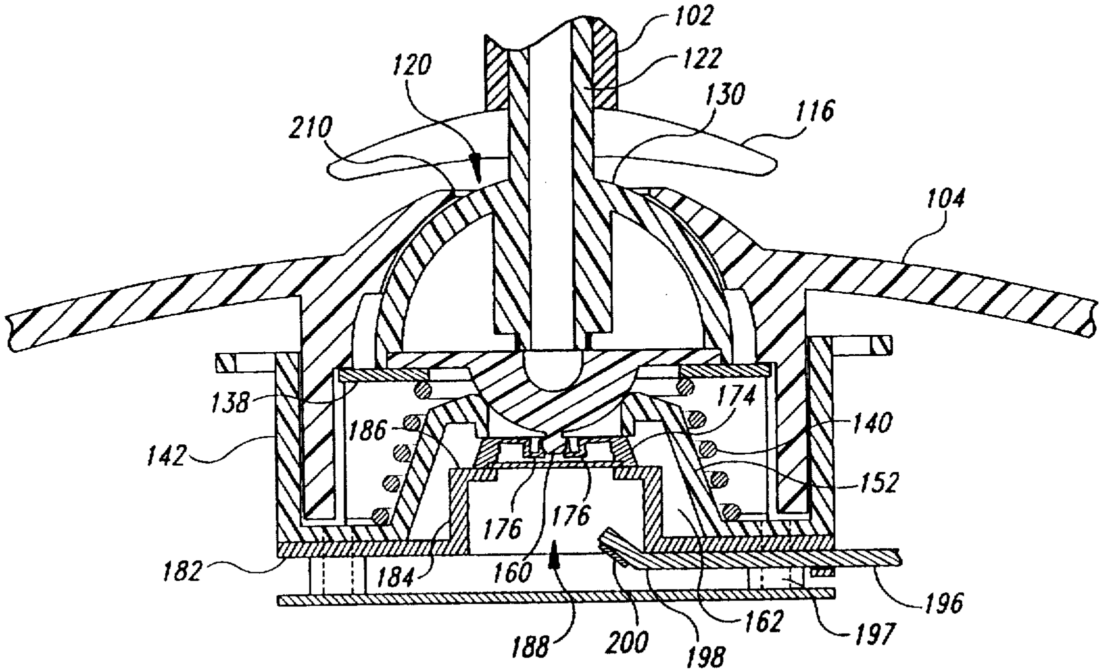
FIG. 8A is an enlarged, fragmenting cross-sectional view of the joystick of FIG. 3 illustrating the operation of the three dimensional to two dimensional conversion with the control stick shown in the center position.

The PC retainer 174 with the retained upper PC board 168 is mounted within the interior portion 162 of the conical protrusion 152. A retainer 182 is fastened to the bottom of the spring retainer 142 to slideably support the PC retainer 174 and retain the PC retainer within the interior portion 162. As seen in FIG. 8A, the retainer 182 has a cylindrical projection 184 that extends upwardly into the interior portion 162 of the conical protrusion 152. The cylindrical projection 184 has a planar upper surface 186 that slideably supports the PC retainer 174 and upon which the PC retainer slides as the control stick 102 is manipulated by the user. When the user tilts the control stick 102, the tab 160 undergoes a corresponding arcuate movement. As will be discussed in detail below, the digital joystick 100 has mechanical structures that translate the three-dimensional arcuate movement of the tab 160 upon tilting of the control stick 102 into a two-dimensional planar movement of the upper PC board 168.

Returning again to FIG. 4, light from the LEDs 170 radiate downwardly through a circular opening 188 in the retainer member 182 onto an electrical position sensing circuit 189 (see FIG. 9) mounted on a lower PC board 192 below the PC retainer 174 and the upper PC board 168. The electrical circuitry 189 on the lower PC board 192 determines the position of the control stick 102 based on the intensity of the light received from the LEDs 170. The electrical circuitry and encoding techniques are discussed in copending U.S. patent application Ser. No. 08/509,082, entitled "Input Device For Providing Multi-Dimensional Position Coordinate Signals To A Computer," filed on Jul. 31, 1995, and incorporated herein by reference in its entirety.

Figure 5A:
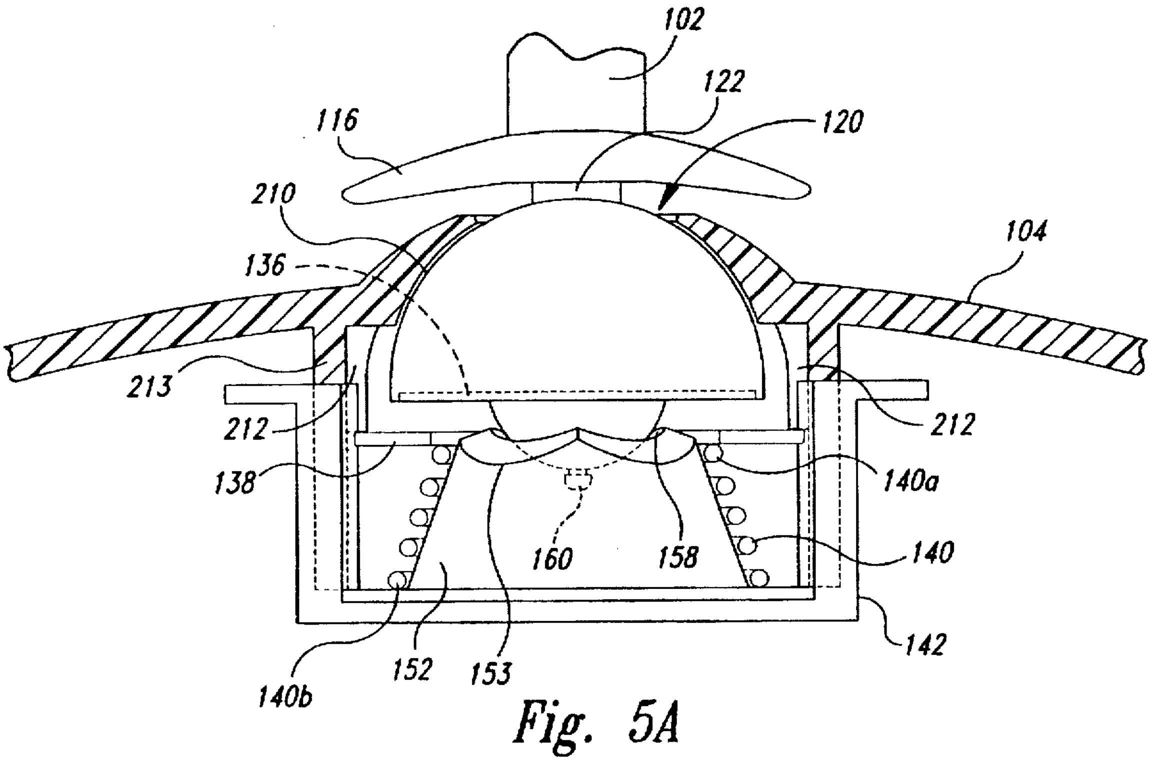
FIG. 5A is a fragmentary, cross-sectional side view of the joystick of FIG. 3 illustrating a control stick centering mechanism.
Figure 5B:
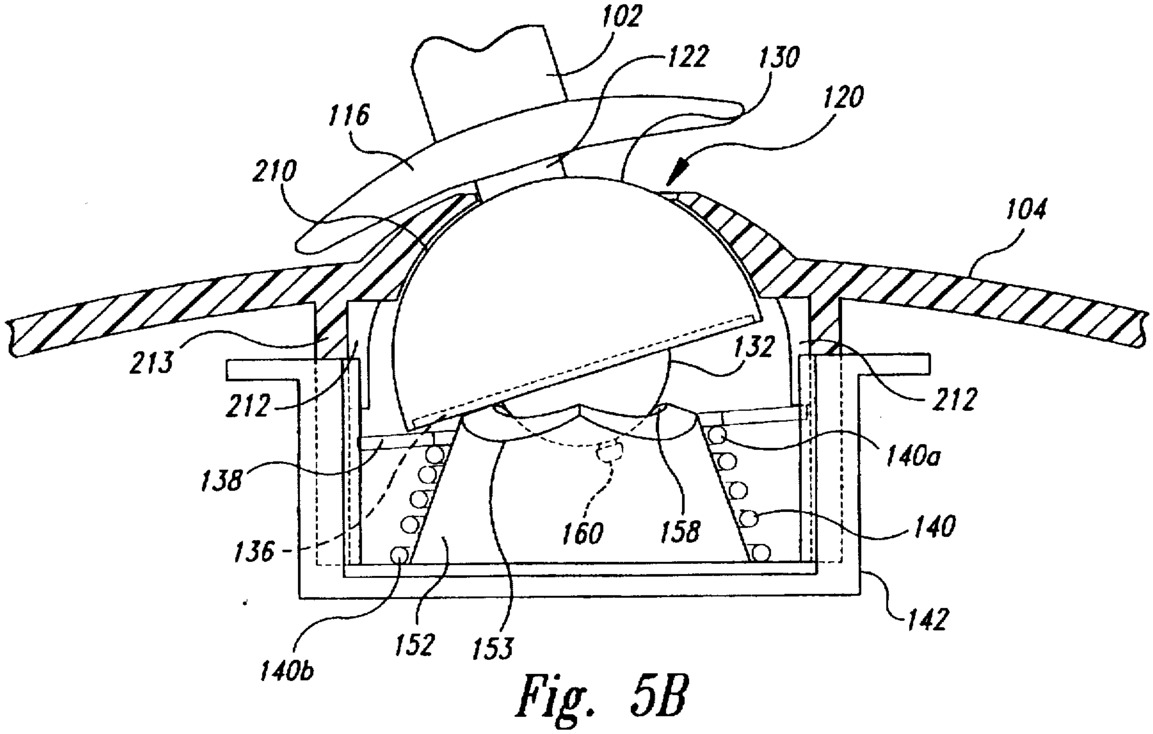
FIG. 5B is a fragmentary, cross-sectional side view of the joystick of FIG. 3 illustrating the control stick centering mechanism when the control stick is displaced from the center position illustrated in FIG. 5A.

Details of the mechanical structures and interaction of the mechanical components will now be discussed in greater detail. As seen in FIGS. 5A and 5B and previously discussed, the upper curved member 130 and shaft 122 extend through the circular aperture 120 in the upper housing portion 104. A beveled surface 210 extending about the circular aperture 120 is designed to mate with the curved surface of the upper curved member 130 to reduce friction between the upper curved member and the upper housing portion when the control stick 102 is tilted by the user. Similarly, the seat 158 in the top portion 153 of the conical protrusion 152 reduces friction between the lower curved member 132 and the spring retainer 142. When the control stick 102 is in the resting position, as illustrated in FIG. 5A, the centering spring 140 applies an equally distributed force about the perimeter of the thrust plate 138. As the control stick 102 and the shaft 122 therein are manipulated by the user from side-to-side, the centering spring 140 is compressed on the side toward which the shaft is tilted, as illustrated in FIG. 5B. When the user releases the control stick 102, the compressed portion of the centering spring 140 applies an upward force on the thrust plate 138 which transmits the upward force to the lip 136 of the lower curved member 132, and hence to the control stick 102, to return the control stick to its resting position.

The upper surface of the thrust plate 138 is in face-to-face juxtaposition with the lip 136 when the control stick 102 is in the resting position as illustrated in FIG. 5A. A plurality of stop elements or stop tabs 212 circumferentially distributed about the circular aperture 120 project downward from an inward side of the upper housing portion 104 to limit the upward travel of the thrust plate 138. The stop tabs 212 are formed integral with a downwardly extending wall 213, which is a portion of the upper housing portion 104, extends partially about the circular aperture 120 and mates with the spring retainer 142 to define an enclosure sized to contain the upper and lower curved members 130 and 132, the thrust plate 138 and other components. Upward movement of the thrust plate 138 is limited by the stop tabs 212 to keep the centering spring 140 partially compressed even when the control stick 102 is in the resting position to provide a minimum amount of free play of the control stick 102 when the control stick is in the resting position. The stop tabs 212 extend downward to a position to allow only a small amount of free play of the control stick 102 at the resting position.

The stop tabs 212 limit the upward movement of the thrust plate, thus forcing the upper end 140a of the centering spring 140 to be flat against the thrust plate. This is illustrated in FIG. 5B where the centering spring 140 is compressed due to user manipulation of the control stick 102 and the lip 36 is tilted downward as a result. The lip 136 in turn forces the thrust plate 138 downward thus compressing one side of the centering spring 140 between the thrust plate 138 and the spring retainer 142. It should be noted that as one side of the thrust plate 138 is forced downward, the opposite side is retained against upward movement by its engagement with the stop tabs 212. As discussed above, the thrust plate 138 and the stop tabs 212 interact to keep the upper end **140*a* of the centering spring 140 flat against the thrust plate as the control stick 102 is manipulated by the user. As the control stick 102 is moved throughout its entire range, the thrust plate 138 and the stop tabs 212 interact to maintain the entirety of the upper end 140A of the centering spring 140 in engagement with the thrust plate. The thrust plate 138 also serves as a bearing to avoid frictional engagement of the upper end 140*a* of the centering spring 140 with the lip 136 of the lower curved member 132**.

A primary advantage of the single centering spring 140 is that it has a uniform return force without the notch that is a well known characteristic of the conventional joystick 2 (see FIG. 1). The return force generated by the centering spring is dependent on displacement of the control stick 102 from the resting position rather than the two independent return forces generated along the X and Y axes by the return springs 18 (see FIG. 1) of the prior art. The centering spring 140 generates a return force whenever the control stick 102 is tilted to an angular displacement from the rest position by the user. As will be discussed below, the maximum displacement is mechanically established by the combination of the lip 136 and the conical protrusion 152 of the spring retainer 142 such that movement is limited beyond the maximum displacement position. The return force generated by the centering spring 140 is always a continuous substantially linear force urging the control stick 102 to its resting position.

Figure 6:
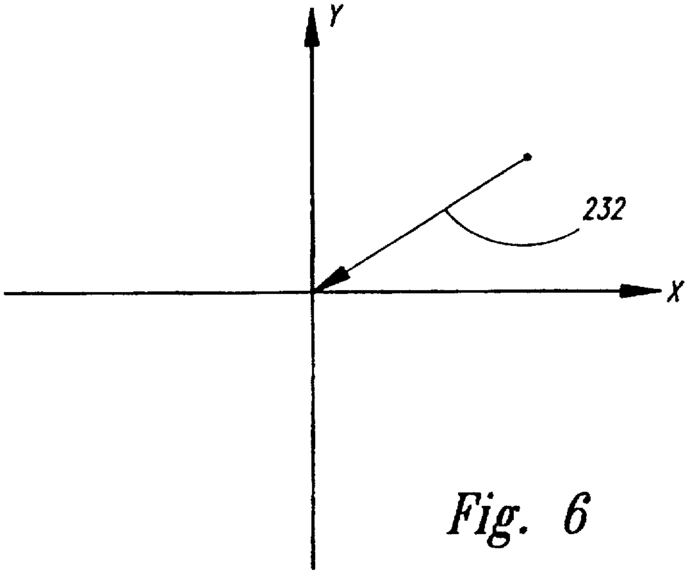
FIG. 6 is a graphical illustration of the vector return force exerted when the joystick of FIG. 3 is displaced.

The return force generated by the centering spring 140 may also be viewed as a vector as shown in FIG. 6. However, the vector forces illustrated in FIG. 2A for the conventional joystick 2 are the result of two independent forces, represented by the X vector 32 generated by the return spring 14 (see FIG. 1) coupled to the X potentiometer 10 and the Y vector 34 generated by the return spring 14 coupled to the Y potentiometer 12. The return force generated by the centering spring 140 of the present invention is a single force represented by the vector 232 in FIG. 6, which is always directed to the resting position. The magnitude of the single vector 232 is dependent on the overall displacement of the control stick 102 from the resting position. While the sum vector 36 (see FIG. 2A) has the same magnitude as the single return force vector 232 of FIG. 6B, the return springs 18 (see FIG. 1) of the conventional joystick 2 each operate independently to return the control stick 4 to its respective axis. The centering spring 140 advantageously allows the user to manipulate the control stick 102 without experiencing the notch of the conventional joystick 2 causing an undesirable pull on the control stick when it passes through the Y axis 6 or the X axis 8. Rather, the centering spring 140 exerts a single return force on the control stick 102 as it is moved about, no matter what position the control stick is moving through. This is particularly advantageous when the control stick 102 is near the Y axis 6 or the X axis 8. As previously discussed, the digital joystick 102 has a minimal amount of free play when the control stick 102 is at the resting position. However, some amount of free play or mechanical slack at the resting position is tolerable to the user. The digital joystick 102 does not have the mechanical slack associated with the return springs 18 (see FIG. 1) of the conventional joystick along each axis.

Figure 7A:
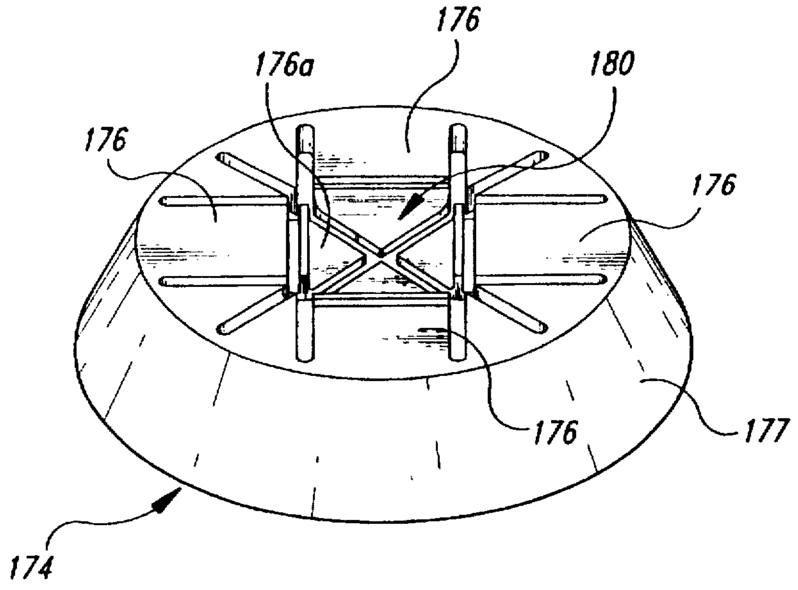
FIG. 7A is a perspective view of a spring member used to convert three dimensional movement of the joystick of FIG. 3 to two dimensional movement.
Figure 7B:
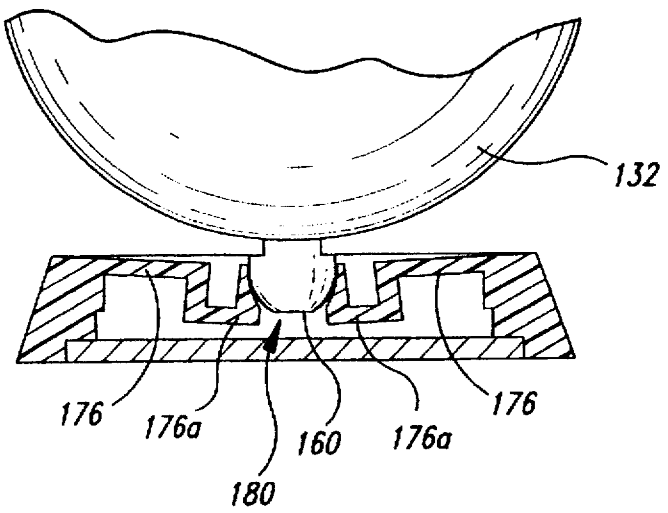
FIG. 7B is a fragmentary cross-sectional view of the spring member of FIG. 7A.

As discussed above, the tab 160 (see FIGS. 5A and 5B) swings in an arcuate fashion as the lower curved member 132 rotates in the seat 158 when the user tilts the control stick 102. While it would be possible to detect the position of the control stick by calculating the position of a light source moving along the arcuate pathway of the tab 160, such calculations are time-consuming. Instead, the digital joystick 100 converts the arcuate movement of the tab 160 into planar sliding movement of the upper PC board 168 and the LEDs 170 mounted thereon. This aspect of the digital joystick 100 is best illustrated in FIGS. 7A–7B in conjunction with FIGS. 8A–8B. As seen in FIG. 7A, the upper portion of the PC retainer 174 has four orthogonally arranged spring members 176 which project inwardly from a ring body 177 and terminate in transversely mounted free-end portions **176*a*. The spring members 176 are flexibly attached on the ring body 177 of the PC retainer 174, and the transverse free-end portions 176*a* are flexibly attached to each of the spring members 176. The free end portions 176*a* define a square-shaped opening receptacle 180 therebetween sized to receive the tab 160 and to maintain mechanical contact therewith. As the tab 160 is inserted into the receptacle 180, it compresses the transverse free-end portions 176*a* to help maintain the mechanical contact between the tab and the PC retainer 174. The continuous mechanical engagement of the tab 160 (see FIG. 7B) with the free-end portions 176*a* on the PC retainer 174 permits accurate position tracking over the entire range of movement of the control stick 102 (see FIG. 4) for all the X, Y, and R positions. This is a significant improvement over the tracking mechanism of the conventional joystick (see FIG. 1) which cannot accurately track the position of the control stick 4** over its entire range of movement.

The PC retainer 174 is slideably retained between a lower surface of the conical protrusion 152 and the sliding surface 186 of the cylindrical projection 184. The tab 160 operates cooperatively with the spring members 176 to translate the arcuate motion of the lower curved surface 132 into a two-dimensional planar sliding movement of the PC retainer 174 and the upper PC board 168 it retains. When the control stick 102 is in its resting position, as illustrated in FIG. 8A, the tab 160 presses equally against all four of the spring members 176, pressing each spring member in a downward direction.

Figure 8B:
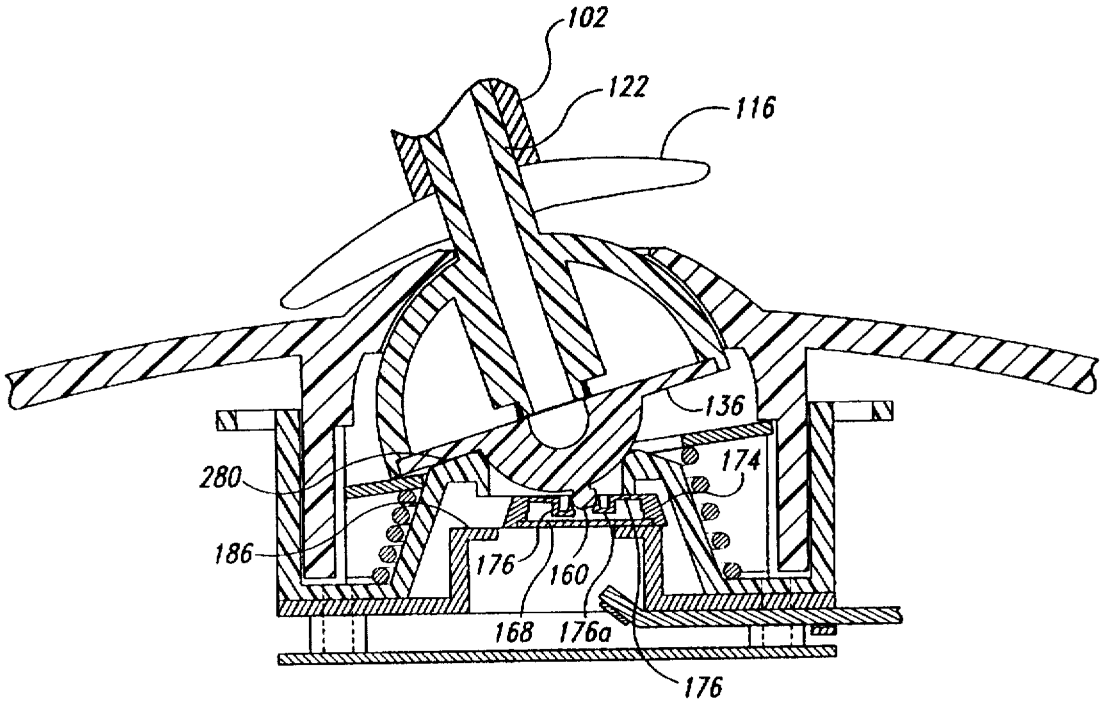
FIG. 8B is a cross-sectional view of the joystick of FIG. 3 illustrating the operation of the three dimensional to two dimensional conversion when the control stick is displaced from the center position shown in FIG. 8A.

When the control stick 102 is tilted by the user away from its resting position, as illustrated in FIG. 8B, the tab 160 moves through the arcuate pathway in the manner previously discussed. However, the tab 160 is still retained in the receptacle 180 by the transverse free-end portions **176*a* (see FIG. 7B) and maintains mechanical contact with the spring members 176. Because the tab 160 travels in an arcuate pathway, the tab 160 will not press equally against all four of the spring members 176 when it is tilted away from the resting position. Rather, the tab 160 presses more against the spring members 176 positioned on the side to which the control stick 102 is being tilted. Conversely, the tab 160 presses less against the spring members 176 positioned opposite the side to which the control stick is being tilted (and away from the direction of tilting movement of the control stick 102). Although the tab 160 has moved through the arcuate pathway, the PC retainer 174 is restrained by the sliding surface 186 of the cylindrical projection 184 to sliding planar movement. The upper PC board 168 and the LEDs 170 mounted thereon move with the PC retainer 174 with the same planar movement. As will be described in greater detail below, the position of the control stick 102 is determined by calculating the position of the LEDs 170 from the light they transmit. Since the LEDs 170 move only in the plane defined by the sliding surface 186**, the calculations required to determine the position of the control stick are simplified.

As previously described, the digital joystick 100 is capable of encoding the position of the control stick 102 in a rotational position R as well as the position in the X and Y directions. As the user tilts the control stick 102 in the X and/or Y directions, the upper curved member 130 and the lower curved member 132 undergo angular displacement, as previously described. However, the control stick 102 may also be rotated about a rotational axis 199 (see FIG. 9) independently of the angular displacement caused by the tilting of the control stick. As the user rotates the control stick 102 indicated by the reference R (see FIG. 9), the upper and lower curved members 130 and 132 also rotate about the rotational axis 199. The beveled surface 210 about the circular aperture 120 and the seat 158 in the conical protusion 152 reduce the friction associated with such rotational movement of the control stick 102. The tab 160 also rotates as the control stick 102 is rotated by the user. Because of the mechanical engagement of the tab 160 in the receptacle 180, the PC retainer 174 and upper PC board 168 also rotate in fixed relation with the control stick 102. Thus, the LEDs 170 on the upper PC board 168 rotates in fixed relation with the control stick 102. As will be described below, the LEDs 170 permit the detection of the rotational position R of the control stick 102.

Another drawback of the conventional joystick 2 shown in FIG. 1 is the position-sensing circuit itself. The position of the control stick 4 in the X and Y directions is determined based on the resistance value of the X and Y potentiometers 10 and 12, respectively. However, as those skilled in the art can readily appreciate, the resistance value of the X and Y potentiometers is subject to variation based on temperature, and other factors. In addition, the accuracy and repeatability of position measurements using the X and Y potentiometers fluctuates due to thermal drift and due to the length of time required by the computer (not shown) to perform such a measurement. The digital joystick 100 uses an optical position measurement system that provides accurate and repeatable positional data that is not subject to resistance variations and thermal drift to as large a degree as the conventional joystick.

The digital joystick 100 provides reliable position data based on optical measurement using the LEDs 170 and the electrical circuitry on the lower PC board 192. Another feature provided by the digital joystick 100 is the ability to encode the rotational position of the control stick 102 on the rotational axis 199 (see FIG. 9). The conventional joystick 2 of FIG. 1 is capable of only detecting the displacement of the control stick 4 in both the X and Y directions. The control stick 4 of the conventional joystick 2 cannot even be rotated about its axis. Indeed, the control stick 4 of the conventional joystick is mechanically constructed to prevent such rotational movement. In contrast, the control stick 102 of the digital joystick 100 is capable of rotating about its rotational axis 199 (see FIG. 9) and the digital joystick is capable of detecting the rotational R position of the control stick in addition to the position of the control stick in the X and Y directions as it is tilted.

Figure 9:
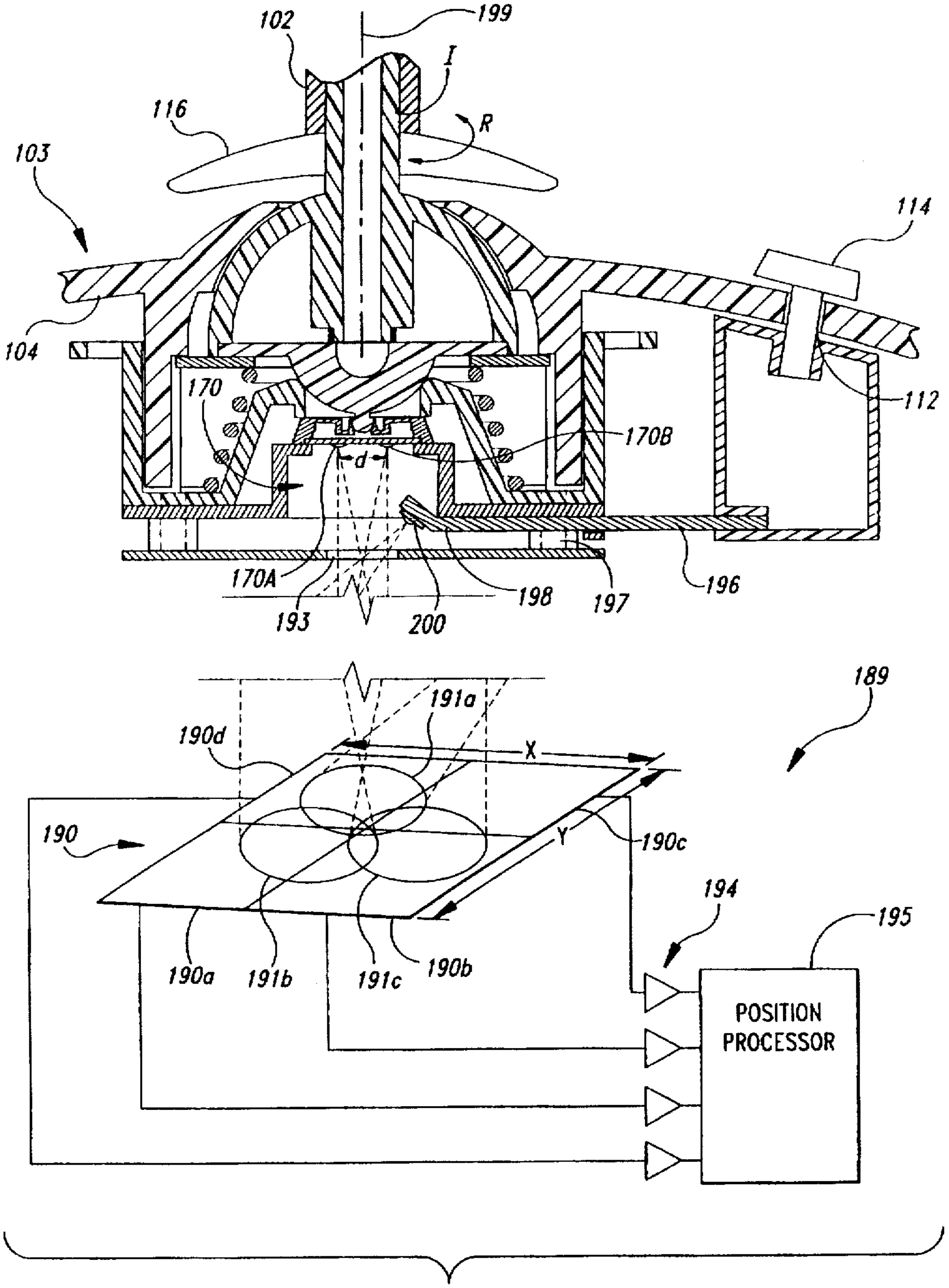
FIG. 9 illustrates the operation of an optical position detection circuit within the joystick of FIG. 3.

As illustrated in FIG. 9, the digital joystick 100 uses optical position sensing techniques to determine the X, Y, and R positions of the control stick 102 and the position of the slideable member 114. The position sensing circuit 189 mounted on the lower PC board 192 includes a photodetector array 190, which senses light emitted from the first and second LEDs 170, separately indicated in FIG. 9 by the reference numerals **170*a* and 170*b*. The photodetector array 190 generates electrical signals indicative of the intensity of the detected light. The photodetector array 190 comprises four independent photodetector elements 190*a*–190*d* in a planar arrangement. Each of the four photodetector elements 190*a*–190*d*** produces an independent output whose value is dependent upon the intensity of light striking the particular element in that photodetector array.

The following is a brief description of the operation of the position sensing circuit 189. The X and Y positions of the control stick 102 are determined using the LED **170*a*. As seen in FIG. 9, for example, the light from the LED 170*a* illuminates an area 191*a* on the photodetector array 190. The position of the illuminated area 191*a* and the intensity of light on each of the elements 190*a*–190*d* of the photodetector array 190 varies as the control stick 102, and hence the LED 170*a*, are manipulated by the user. The output of each of the elements 190*a*–190*d* is analyzed to determine the X and Y positions of the control stick 102 based on the distribution of the light cast upon the photodetector array 190. The mathematics used to determine the position of the control stick 102** are readily apparent to those of ordinary skill in the art and need not be discussed herein.

The two LEDs **170*a* and 170*b* are mounted in a coplanar arrangement and separated by a predetermined distance illustrated by the reference letter "d" in FIG. 9. An aperture 193 is placed between the LEDs 170*a* and 170*b* and the photodetector array 190. The aperture 193 is circular in shape and has an area approximately equal to the active area of one of the elements 190*a*–190*d* of the photodetector array 190. The aperture 193 is positioned such that light from both of the LEDs 170*a* and 170*b* always provides some illumination on each of the elements 190*a*–190*d*. Furthermore, the aperture 193 is positioned such that all of the light from the LEDs 170*a* and 170*b* will only strike the active surface of the photodetector array 190. In this manner, all light from the LEDs 170*a* and 170*b* illuminates the four elements 190*a*–190*d* of the photodetector array 190, with different elements receiving varying amounts of light depending on the position of the control stick 102. It should be noted that the overall intensity of the light from the LEDs 170*a* and 170*b* is constant and that it is the distribution of the light intensity over the four elements 190*a*–190*d* of the photodetector array 190 that allows a precise determination of the position of the control stick 102**.

The use of the LED **170*b* on the control stick 102 allows the R position of the control stick to be determined. In the presently preferred embodiment, the LEDs 170*a* and 170*b* are time-division multiplexer so that only one light source is on at any given moment in time. As seen in FIG. 9, for example, the light from each of the LEDs 170*a* and 170*b* illuminates areas 191*a* and 191*b*, respectively, of the photodetector array 190 corresponding to a particular position of the control stick 102. By independently calculating the position of the illuminated areas 191*a* and 191*b* on the photodetector array 190, the digital joystick 100 can determine the R position of the control stick 102 (i. e., determine the amount the control stick has been rotated on the shaft 122). The output signals generated by the photodetector array are amplified by conventional amplifiers 194 and processed by a position processor 195, such as a conventional microprocessor. Using geometry and simple mathematics, the X, Y and R positions of the control stick 102** may be readily determined.

As previously discussed, the tab 160 (see FIG. 8A), extends into the receptacle 180 and maintains mechanical contact with the spring members 176 as the control stick 102 is tilted and rotated. As also discussed, the movement of the upper PC board 168 and the first and second LEDs 170 carried thereon is restricted to movement in the plane defined by the upper surface 186 of the cylindrical projection 184 as the control stick 102 is tilted. As the control stick 102 is rotated, the upper PC board 168 and the first and second LEDs 170 rotate in the plane defined by the upper surface 186 of the cylindrical projection 184.

The control stick 4 of the conventional joystick 2 is limited to movements in only the X and Y directions. If the user wishes to encode additional position data, the conventional joystick 2 is incapable of generating such additional position data. In contrast, the digital joystick 100 permits the encoding of four separate movements. Three of the movements, the X direction, Y direction, and R direction are associated with movement of the control stick 102, as discussed above. The fourth independent movement is produced by the slideable member 114.

The slideable member 114, which projects through the slot 112 of the upper housing portion 104 is coupled to a pivot arm 196, best illustrated in FIGS. 8A and 8B. The pivot arm 196 swivels on a pivot pin 197 mounted on the retainer member 182. A free end portion 198 of the pivot arm 196 projects slightly into the circular opening 188 of the retainer member 182. An LED 200 mounted on the free end portion 198 directs light onto the photodetector array 190. As the slideable member 114 is manipulated by the user, the free end portion 198, and the LED 200, move in an arcuate path, thus changing the distribution of the light directed onto the photodetector array 190 from the pivoting LED 200. This gives the user a completely independent positional control device in addition to the three directions of movement of the control stick 102. The position of the slidable member 114 is optically detected in the same manner discussed above with respect to the control stick 102.

Light from the LED 200 is directed onto the photodetector array 190 to produce, for example, an illuminated area **191*c* as shown in FIG. 9. The LED 200 is also time-division multiplexed with the LEDs 170*a* and 170*b* so that only one of the three LEDs 170*a*, 170*b* and 200 is on at any given moment in time. The digital joystick 100 determines the position of the slideable member 114 based on the distribution of light cast upon the photodetector array 190 when the LED 200 is illuminated in the same manner as the LED 170***a* is used to determine the X and Y position of the control stick 102. Thus, the photodetector array 190 generates electrical signals related to the X, Y, and R positions of the control stick 102, as well as the position of the slideable member 114.

Figure 10A:
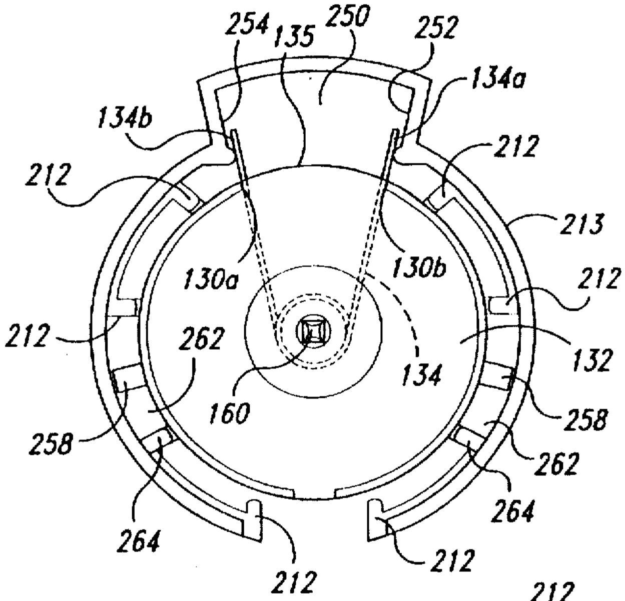
FIG. 10A is a bottom plan view of the lower portion of the joystick of FIG. 3 illustrating the operation of a rotational return spring when the control stick is in its resting position.
Figure 10B:
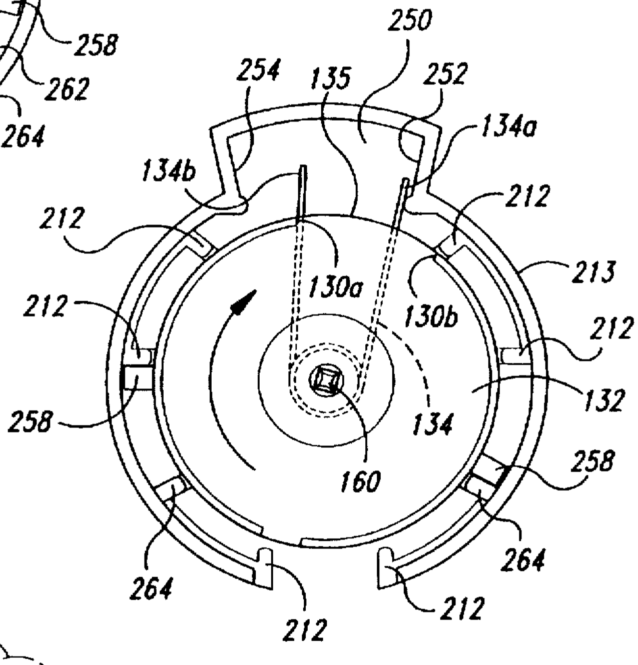
FIG. 10B is a bottom plan view of a lower portion of the joystick of FIG. 3 illustrating the operation of a rotational return spring when the control stick is displaced from its rotational resting position shown in FIG. 10A.

While the centering spring 140 exerts a force on the control stick 102 to urge the control stick to its resting position in the X and Y directions, the rotational return spring 134 (see FIG. 4) exerts a rotational force on the control stick to urge the control stick to a resting rotational position which is illustrated in FIG. 10A. As illustrated in FIG. 4, the rotational return spring 134 is mounted between the upper curved member 130 and the lower curved member 132. A lower end of the shaft 122 extends through a central coil of the rotational return spring 134 to hold the spring in position. The rotational return spring 134 has a pair of free end portions 134*a* and 134*b* that project outward through a side opening 135 in the upper curved member 130 defined by opposing edge portions 130*a* and 130*b* of the upper curved member 130, and extend into a recess 250 defined by the wall 213 of the upper housing portion 104, as best illustrated in FIGS. 10A and 10B. The free end portions 134*a* and 134*b* of the rotational return spring 134 are each urged against one of a pair of opposing side walls 252 and 254 of the recess 250 by the spring action of the rotational return spring. In the resting rotational position of the control stick 102, the free end portions 134*a* and 134*b* press equally against the side walls 252 and 254 to maintain the control stick in the resting rotational position unless rotated therefrom by the user.

When the user rotates the control stick 102, the free end portions 134*a* and 134*b* no longer press equally against the side walls 252 and 254. As illustrated in FIG. 10B, where the control stick 102 has been rotated by the user in a clockwise direction, as viewed from below, the edge portion 130*a* engages the free end portion 134*b* and carries it away from contact with the side wall 254 due to the clockwise rotation of the control stick. However, the free end portion 134*b* remains in contact with the side wall 154 creating an imbalanced condition with the rotational return spring 134 tending to apply a force to the control stick 102, through the shaft 122, to rotate the control stick 102 back to the resting rotational position. A similar but opposite return force is exerted by the rotational return spring 134 by the free end portion 134*b* against the side wall 254 if the control stick 102 is rotated by the user in a counterclockwise direction, as viewed from below. In this manner, the control stick 102 can be rotationally displaced from the rotational rest position and will be automatically returned to the rotational resting position by the force applied by the rotational return spring 134.

The extent of rotation of the control stick is limited by a pair of projections 258 of the upper curved member 130, which each extend outward into a circumferentially extending space 262 between the upper curved member 130 and the wall 213 of the upper housing portion 104. The circumferential space 262 has the stop tabs 212 which engage and limit upward travel of the thrust plate 138 located therein, and a pair of stop ribs 264. Each of the stop ribs 264 is spaced apart from one of the stop tabs 212 and has one of the projections 258 positioned therebetween. The corresponding stop tab 212 and stop rib 264 are sized to be engaged by the projection 258 therebetween as the control stick 102 is rotated and hence provide rotational limits for the control stick. In the rotational resting position, each of the projections 258 is substantially centered between the corresponding stop tab 212 and stop rib 264. However, as the control stick 102 is rotated by the user, the projections 258 rotate with the control stick and limit its rotation when they encounter either the stop tab 212 or the stop rib 264. As seen in FIG. 10B, one of the projections 258 has encountered the stop tab 212 and the other has engaged the stop rib 264, thus preventing further clockwise rotational movement of the control stick 102.

In the conventional joystick 2 of FIG. 1, the control stick 4 extends through a square opening (not shown) in the joystick housing (not shown). The square opening thus restricts the tilting end limits of movement of the control stick 4 to a desirable square pattern.

As previously discussed, in the digital joystick 100 of the present invention, the upper curved member 130 extends upward through the circular aperture 120 of the upper housing portion 104. Since the end limits of tilting movement of the control stick 102 is conventionally limited by the geometry of the aperture through which the control stick extends, given the circular shape of the circular aperture 120, a conventional design would provide the control stick 102 with circular end limits of tilting movement. However, in the digital joystick 100 of the present invention, the desired square pattern of end limit movement is accomplished using the lip 136 of the lower curved member 132 functioning in combination with the conical protrusion 152 of the spring retainer 142.

Figure 11:
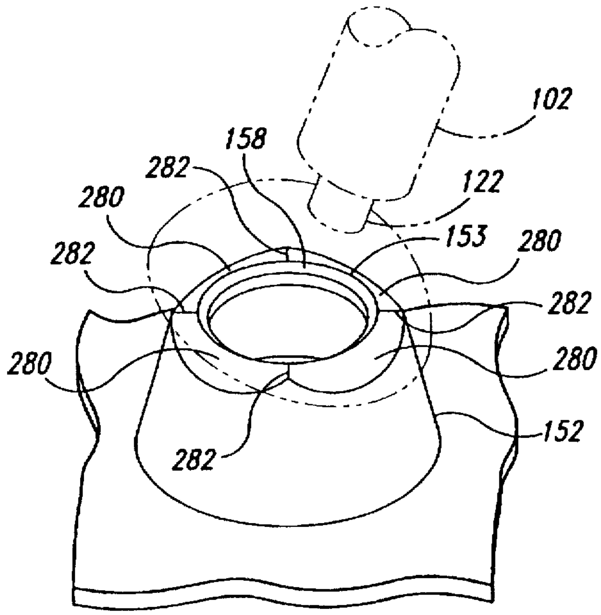
FIG. 11 is a fragmentary view of the joystick of FIG. 3 illustrating the mechanism used to limit planar movement of the joystick.

As best illustrated in FIG. 11, the top portion 153 of the conical protrusion 152 has four flat, beveled surfaces 280 positioned about and outward of the seat 158 which receives the lower curved member 132. The beveled surfaces 280 are each separated by a crown 282. As the control stick 102 is tilted, the lip 136 encounters one of the beveled surfaces 280 or one of the crowns 282, which defines an end limit to the tilting movement of the control stick. The crowns 282 are oriented to correspond to the X and Y directions of movement of the control stick 102. For example, if tilted fully in the direction of one of the crowns 282, the control stick 102 is prevented from tilting beyond when the lip 36 makes contact with the crown 282 in the direction of movement. The beveled surfaces 280 have an orthogonal relationship with respect to each other and are oriented to correspond to diagonal directions of movement of the control stick 102 between the X and Y directions and thus are each located between a pair of crowns 282. For example, if tilted fully in the direction of one of the beveled surfaces 280, the control stick 102 is prevented from tilting there beyond when the lip 136 makes physical contact with the beveled surface 280 in the direction of movement. In FIG. 8B the control stick 102 is shown tilted fully with the lip 136 in face-to-face juxtaposition with one of the beveled surfaces 280. The beveled surface 280 permits a greater maximum tilting of the control stick than does the crown 282, thus producing a square pattern for the end limits of tilting movement of the control stick 102 in the X and Y directions even though the circular aperture 120 would otherwise allow a circular pattern.

The digital joystick 100 of the present invention offers the advantages of smooth mechanical operation, even return force of the control stick 102, highly accurate and repeatable positional encoding, and several degrees of freedom in the positional encoding.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A joystick, comprising:

a housing;

a control stick having an upper end for grasping and moving by a user to position said control stick and a lower end movably mounted within said housing with movement thereof being responsive to user movement of said control stick upper end, said control stick having a resting position relative to said housing when not grasped by the user;

a position sensing circuit within said housing to detect the position of said control stick;

a spring retainer fixedly mounted within said housing; and a coil spring having an upper spring end operatively engaging said control stick lower end and a lower spring end operatively engaging said spring retainer to compress said coil spring between said control stick lower end and said spring retainer to apply a centering force to said control stick to cause said control stick to return to the resting position.

2. The joystick of claim 1 wherein said control stick lower end has an engagement surface, and the joystick further includes a thrust member mounted between said upper spring end and said control stick engagement surface, and a plurality of circumferentially distributed stop elements mounted within said housing to limit upward movement of said thrust member when said control stick is moved by the user to maintain said upper spring end in continuous mechanical contact with said thrust member.

3. The joystick of claim 2 wherein said continuous mechanical contract with said thrust member is along a substantially flat surface of said thrust member and said engagement surface is a substantially flat surface.

4. The joystick of claim 3 wherein said control stick upper end is moveable throughout a predetermined range and wherein said upper spring end has a length of contact surface engaging said thrust member, and said stop elements are positioned to maintain said length of contact surface in engagement with said thrust member along the entirety of said length of contact surface during movement of said control stick upper end throughout said predetermined range of movement.

5. The joystick of claim 1 wherein said housing has a housing retainer portion with an aperture through which said control stick upper end extends, the joystick further including a control stick retainer and upper and lower curved members on said control stick lower end, said upper curved member having a substantially hemispherical surface with a first diameter sized to be received and retained against upward movement by said housing retainer portion, said lower curved member having a substantially hemispherical surface with a second diameter smaller than said first diameter to be rotatably received and retained against downward movement by said control stick retainer.

6. The joystick of claim 5 wherein said upper and lower curved members having a common center point.

7. The joystick of claim 1, further including a substantially circular aperture in said housing through which said control stick upper end extends, an engagement surface on said control stick lower end and a limit member engaging said engagement surface as said control stick upper end is moved by the user, said engagement surface and said limit member being engageable to limit movement of said control stick upper end to substantially square pattern of movement.

8. The joystick of claim 7 wherein said limit member comprises four orthogonally arranged beveled surfaces with a ridge between each adjacent pair of said beveled surfaces, said engagement surface coming into mechanical contact with said beveled surfaces or said ridges to limit the movement of said control stick upper end.

9. The joystick of claim 1 wherein said control stick is rotatably retained by said housing for selective rotation about an axis of rotation by the user, said position sensing circuit also detecting a rotation position of said control stick.

10. The joystick of claim 9 wherein said control stick has a rotational resting position, the joystick further including a rotational spring mounted within said housing to urge said control stick to said rotational resting position.

11. The joystick of claim 10 wherein said housing includes a rotational spring recess defined by a pair of walls and said rotational spring has first and second free-end portions that extend into said rotational spring recess to each engage one of said pair of walls and apply a return force through one of said free-end portions against one of said engaged pair of walls as the user selectively rotates said control stick first end.

12. A joystick, comprising:

a housing;

a control stick coupled to said housing for grasping and moving by a user to position said control stick in first and second orthogonal directions, said control stick having a resting position in said first and second directions, a centering spring operatively engaging said control stick to exert a spring force on said control stick to urge said control stick to said resting position in said first and second directions; and a position detector coupled to said control stick to detect a position of said control stick in the first and second directions and a rotational position and to generate positional data related thereto.

13. The joystick of claim 12 wherein said control stick has a bottom end and said centering spring is a coil spring compressed between said bottom end and a spring retaining member to exert the spring force on said bottom end.

14. The joystick of claim 12 wherein said control stick has a rotational resting position, the joystick further including a rotational spring mounted within said housing to urge said control stick to said rotational resting position.

15. The joystick of claim 12, further including a slideable member slideably mounted to said housing and operable by the user, said slideable member including a third light source directed toward said light detector, said position detector also detecting a position of said third light source on said light detector and determining a position of said slideable member based on said detected position of said third light source.

16. The joystick of claim 12 wherein said control stick has first and second ends, said first end being grasped and moved by the user and wherein said position detector is an optical circuit optically linked to said control stick, the joystick further including first and second light sources and a light detector, one of said light sources and said light detector being mechanically coupled to said control stick second end and the other of said light sources and said light detector being mounted in a fixed position with respect to said control stick second end, said light detector detecting fluctuations in light intensity to determine said control stick position.

17. The joystick of claim 16 wherein said control stick second end moves in an arcuate pathway as said control stick first end is moved by the user, the joystick further including a coupling member having a flexible portion in mechanical contact with said control stick second end to move with said control stick second end and a planar sliding surface within said housing, said coupling member being slideably positioned between said control stick second end and said sliding surface to constrain movement of said coupling member with said control sick second end to a plane defined by said sliding surface.

18. The joystick of claim 17 wherein said coupling includes a rigid portion retaining said first and second light sources for movement therewith to move in said plane in response to movement of said control stick first end by the user.

19. A joystick, comprising:

a housing;

a control stick coupled to said housing and having first and second ends, said control stick first end for grasping and moving by a user to position said control stick, said control stick second end moving in an arcuate pathway in response to movement of said control stick first end by the user;

a planar sliding surface within said housing in proximity with said control stick second end;

a coupling member in mechanical contact with said control stick second end and slideably positioned between said control stick second end and said sliding surface to constrain movement of said coupling to a plane defined by said sliding surface and thereby translate movement of said control stick second end in the arcuate pathway into planar movement of said coupling member; and a position detection circuit positioned in proximity with said coupling member to detect user movement of said control stick first end based on the planar movement of said coupling member on said sliding surface.

20. The joystick of claim 19 further including a retainer member between said control stick second end and said coupling member to retain said coupling member against said sliding surface.

21. The joystick of claim 19 wherein said control stick first end has a resting position when not being moved by the user, the joystick further including a centering spring operatively engaging said control stick second end to exert a spring force on said control stick second end to urge said control stick first end to said resting position.

22. The joystick of claim 21 wherein said centering spring is a coil spring, the joystick further including a spring retaining member to maintain said spring in a partially compressed position between said control stick second end and said spring retaining member to exert the spring force on said control stick second end.

23. The joystick of claim 19 wherein said position detection circuit is an optical circuit comprising:

a first light source emitting a first light; and a light detector assembly positioned to receive said first light and to detect a position of said first light on said light detector assembly, one of said light source and said light detector assembly being mounted on said coupling member and moving in said plane in response to movement of said control stick first end by the user and the other of said light source and said light detector assembly being mounted in a fixed position with respect to said coupling member.

24. The joystick of claim 23 wherein said control stick is rotatably retained by said housing for selective rotation about an axis of rotation by the user, the joystick further including a second light source mounted in fixed relation with said first light source and emitting a second light, said light detector assembly also detecting a position of said second light and determining a rotation position of said control stick based on said detected positions of said first and second lights as the user selectively rotates said control stick first end about said axis of rotation.

25. The joystick of claim 24 wherein said control stick has a rotational resting position, the joystick further including a rotational spring mounted within said housing to urge said control stick to said rotational resting position.

26. The joystick of claim 25 wherein said housing includes a rotational spring recess defined by a pair of walls and said rotational spring has first and second free-end portions that extend into said rotational spring recess to each engage one of said pair of walls and apply a return force through one of said free-end portions against one of said engaged pair of walls as the user selectively rotates said control stick first end.

27. The joystick of claim 23, further including a slideable member slideably mounted to said housing and operable by the user, said slideable member including a second light source emitting a second light having constant intensity, said light detector assembly detecting a position of said second light on said light detector assembly and determining a position of said slideable member based on said detected position of said second light.

* * * * *